(12) United States Patent
Kim

(10) Patent No.: US 8,189,160 B2
(45) Date of Patent: May 29, 2012

(54) DISPLAY SUBSTRATE AND LIQUID CRYSTAL DISPLAY PANEL HAVING THE SAME

(75) Inventor: Dong-Gyu Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 517 days.

(21) Appl. No.: 12/408,550

(22) Filed: Mar. 20, 2009

(65) Prior Publication Data

US 2009/0310075 A1   Dec. 17, 2009

(30) Foreign Application Priority Data

Jun. 13, 2008   (KR) .............................. 10-2008-55860

(51) Int. Cl.
*G02F 1/1343* (2006.01)

(52) U.S. Cl. .................. 349/144; 349/143; 349/146
(58) Field of Classification Search .................. None
See application file for complete search history.

(56) References Cited

U.S. PATENT DOCUMENTS

| | | | |
|---|---|---|---|
| 6,542,212 B2 * | 4/2003 | Yoshida et al. | 349/141 |
| 7,649,602 B2 * | 1/2010 | Chen et al. | 349/129 |
| 7,880,852 B2 * | 2/2011 | Kim | 349/145 |
| 2002/0024626 A1 * | 2/2002 | Lee et al. | 349/141 |
| 2004/0109122 A1 * | 6/2004 | Kumagawa et al. | 349/143 |
| 2006/0263920 A1 * | 11/2006 | Kim et al. | 438/30 |
| 2009/0046234 A1 * | 2/2009 | Tanaka | 349/141 |
| 2009/0086144 A1 * | 4/2009 | Chen et al. | 349/141 |
| 2009/0251654 A1 * | 10/2009 | Itou et al. | 349/141 |
| 2010/0123845 A1 * | 5/2010 | Kim et al. | 349/46 |
| 2010/0141879 A1 * | 6/2010 | Lee et al. | 349/114 |
| 2010/0157232 A1 * | 6/2010 | Kim et al. | 349/144 |

* cited by examiner

*Primary Examiner* — Mike Stahl
(74) *Attorney, Agent, or Firm* — Innovation Counsel LLP

(57) ABSTRACT

A display substrate comprises gate lines, data lines intersecting the gate lines, and a pixel electrode connected to at least one of the gate lines and at least one of the data lines. The pixel electrode comprises one or more micro-slit patterns each of which comprises a plurality of micro-electrodes separated by slits. The pixel electrode comprises a first shielding pattern interconnecting end portions of two or more of the micro-electrodes of one of the one or more micro-slit patterns, the end portions overlapping with one of the gate lines.

26 Claims, 15 Drawing Sheets

DISPLAY SUBSTRATE AND LIQUID CRYSTAL DISPLAY PANEL HAVING THE SAME

PRIORITY STATEMENT

This application claims priority under 35 U.S.C. §119 to South Korean Patent Application No. 2008-55860, filed on Jun. 13, 2008 in the Korean Intellectual Property Office (KIPO), the contents of which are incorporated herein by reference in their entirety.

BACKGROUND OF THE INVENTION

1. Field of the Invention

The present invention relates to a display substrate and a liquid crystal display (LCD) panel having the display substrate. More particularly, embodiments of the present invention relate to a display substrate for displaying an image and an LCD panel having the display substrate.

2. Description of the Related Art

Generally, an LCD panel includes a lower substrate having thin-film transistors (TFTs) used as switching devices to drive pixels, an upper substrate opposite to the lower substrate, and a liquid crystal layer disposed between the lower substrate and the upper substrate. The upper and lower substrates may include transparent electrodes opposite each other. The liquid crystal molecules are tilted in directions determined by the electric field formed between the transparent electrodes. The electric field thus controls the light transmittance of the liquid crystal to display a desired image.

In order to improve the viewing angle of an LCD panel having a vertically aligned (VA) mode, a patterned vertically aligned (PVA) mode has been developed. In a PVA mode LCD panel, each of the transparent electrodes is patterned to include openings. When the lower substrate and the upper substrate are assembled together, the openings on the lower and upper substrates must be aligned with each other. The alignment can be difficult to achieve.

To solve the alignment problem, the upper substrate's electrode (the common electrode) can be left unpatterned. In the lower substrate, the openings can be formed as certain patterns of fine slits. These patterns are arranged to prevent misalignment. In addition, this structure eliminates the patterning process for the common electrode and thus leads to improved productivity. However, the slit patterns may cause distortion of liquid crystal directors, and this distortion may lead to light leakage when displaying a black image, or may lead to decreased light transmittance when displaying a white image.

SUMMARY

Some embodiments of the present invention provide a display substrate capable of minimizing distortion of liquid crystal directors to improve display quality.

Some embodiments of the present invention also provide a liquid crystal display (LCD) panel having the above-mentioned display substrate.

Some embodiments of the present invention also provide a method of manufacturing the above mentioned display substrate.

According to one aspect of the present invention, a display substrate comprises a plurality of gate lines; a plurality of data lines intersecting the gate lines; and a pixel electrode connected to at least one of the gate lines and at least one of the data lines, the pixel electrode comprising one or more micro-slit patterns each of which comprises a plurality of micro-electrodes separated by slits, the pixel electrode comprising a first shielding pattern interconnecting end portions of two or more of the micro-electrodes of one of said one or more micro-slit patterns, the end portions overlapping with one of the gate lines.

In an example embodiment of the present invention, a micro-slit pattern's micro-electrodes may extend in any direction and may be oblique to the gate lines and the data lines. The first shielding pattern may be parallel to the gate lines.

In an example embodiment of the present invention, the display substrate may further include a switching element and a contact pattern. The switching element may be electrically connected to the pixel electrode. The contact pattern may make contact with an output electrode of the switching element and be connected to an adjacent end portion of a micro-electrode of a micro-slit pattern. The end portion may meet the contact pattern at an angle of about 90°. The output electrode and the contact pattern may each have a chamfered corner.

In an example embodiment of the present invention, the pixel electrode may include a first sub-pixel electrode and a second sub-pixel electrode which receive respective different voltages. A second shielding pattern or a third shielding pattern may be formed at a boundary between the first sub-pixel electrode and the second sub-pixel electrode. The first sub-pixel electrode may include a first micro-slit pattern, and the second sub-pixel electrode may include a second micro-slit pattern. The second shielding pattern may interconnect end portions of micro-electrodes of the first micro-slit pattern, and the third shielding pattern may interconnect end portions of micro-electrodes of the second micro-slit pattern.

According to another aspect of the present invention, a liquid crystal display panel comprises a display substrate comprising a pixel electrode. The display substrate comprises gate lines and data lines intersecting the gate lines. The pixel electrode is connected to at least one of the gate lines and at least one of the data lines. The pixel electrode comprises a plurality of micro-slit patterns each of which comprises a plurality of micro-electrodes separated by slits. The pixel electrode comprises a first shielding pattern interconnecting end portions of a plurality of the micro-electrodes, the end portions overlapping with one or more of the gate lines.

The LCD panel also comprises an opposite substrate opposite to the display substrate and comprising a common electrode. A liquid crystal layer is provided between the display substrate and the opposite substrate.

According to some embodiments of the present invention, the first shielding pattern opposes propagation of the electric field formed at a gate line to prevent distortion of liquid crystal directors.

The second and/or third shielding patterns oppose propagation of electric fields formed at the first and/or second sub-pixel electrodes to prevent distortion of liquid crystal directors.

Furthermore, the connections between the contact patterns and the adjacent micro-electrodes of the micro-slit patterns are chosen to prevent distortion of the liquid crystal directors. Thus, textured image defects generated by light leakage and distortion of the liquid crystal directors may be minimized to improve the display quality of an LCD apparatus.

The present disclosure of invention is not limited to the patterns discussed hereinabove but instead includes additional embodiments within the spirit and scope of the present teachings.

DESCRIPTION OF SOME EMBODIMENTS

Figure 1:
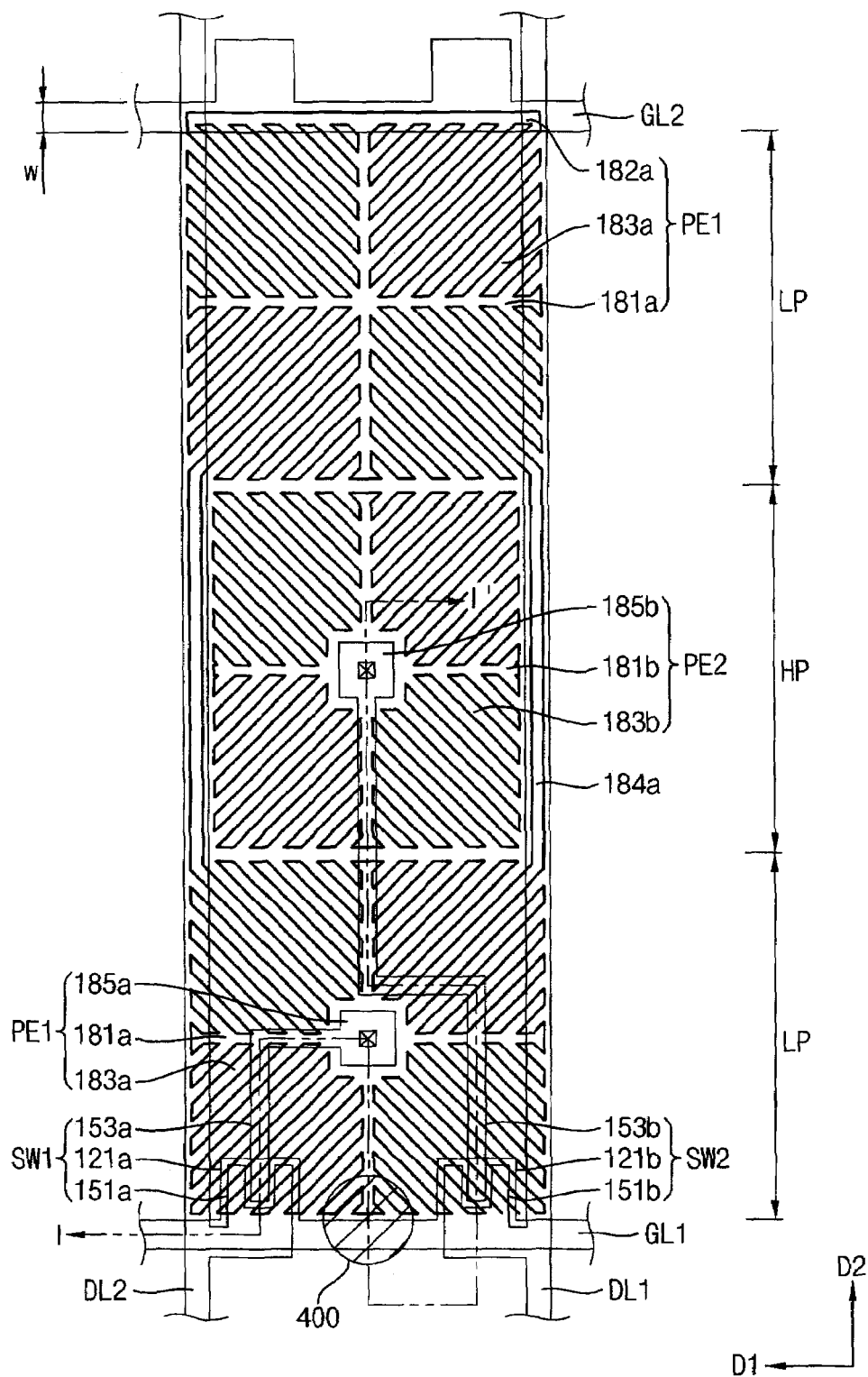
FIG. 1 is a plan view illustrating a liquid crystal display (LCD) panel in accordance with Embodiment 1 of the present invention.

Some embodiments of the present invention are described more fully below with reference to the accompanying drawings. The present invention may, however, be embodied in many different forms and should not be construed as limited to the embodiments set forth herein.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like reference numerals refer to like elements throughout.

It will be understood that terms like "first", "second", "third" etc. may be used herein as labels to distinguish one element from another. These terms do not limit the invention.

Spatially relative terms, such as "beneath," "below," "lower," "above," "upper" and the like, may be used herein to describe relative positions of different elements in the figures. These terms and the figures do not limit the special orientation of any device in use or operation except as specified otherwise. For example, the device may be turned upside down or rotated or positioned at any angle and orientation.

The drawings may not accurately reflect every feature of every embodiment of the invention. For example, a doped region illustrated as a rectangle may in fact have a rounded or curved boundary and further the dopant concentration may change gradually at the boundary rather than in an abrupt fashion. Likewise, in showing an implanted buried region, the drawings may omit a representation of a dopant implanted between the buried region and the surface through which the implantation takes place. Thus, the regions illustrated in the figures are schematic in nature and their shapes do not necessarily illustrate the actual shapes and do not limit the scope of the present invention.

Example Embodiment 1

Figure 2:
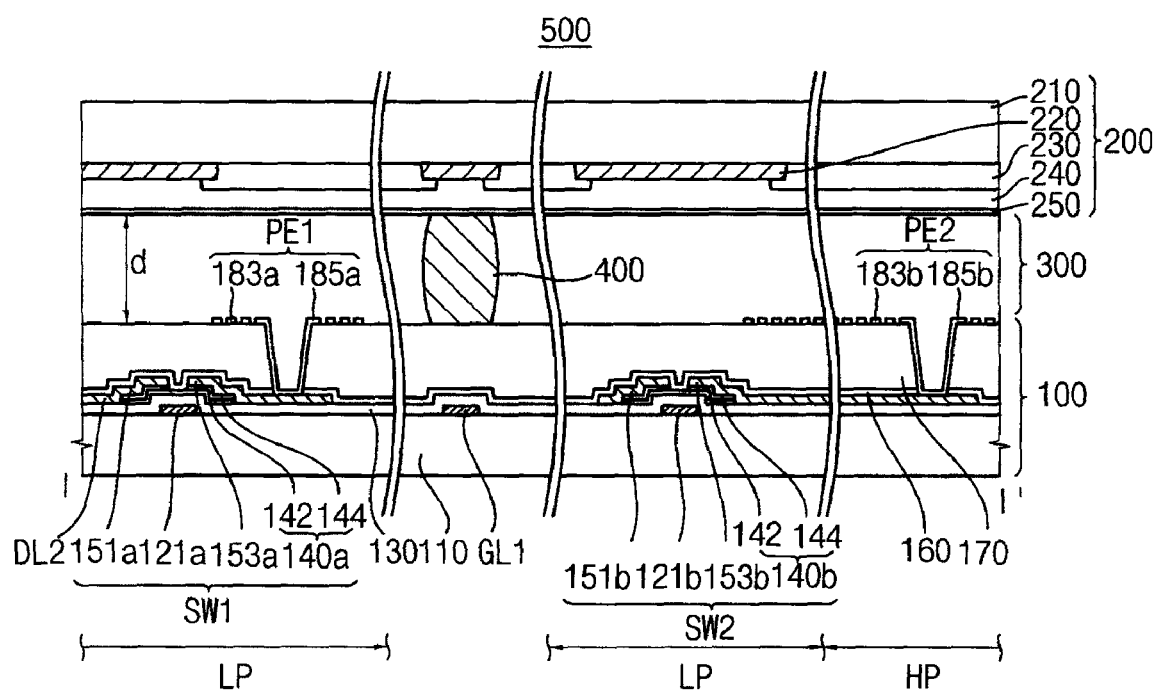
FIG. 2 is a cross-sectional view taken along a line I-I' shown in FIG. 1.

FIG. 1 is a plan view illustrating a liquid crystal display (LCD) panel in accordance with Embodiment 1 of the present invention, and FIG. 2 is a cross-sectional view taken along a line I-I' shown in FIG. 1.

Referring to FIGS. 1 and 2, a first LCD panel 500 includes a first display substrate 100, a first opposite substrate 200 facing the first display substrate 100, and a liquid crystal layer 300. The liquid crystal layer 300 is disposed between the first display substrate 100 and the first opposite substrate 200.

The first display substrate 100 includes a plurality of gate lines such as a first gate line GL1 and a second gate line GL2, and a plurality of data lines such as DL1 and DL2. Each pixel may include thin-film transistors (TFTs) such as a first transistor SW1 and a second transistor SW2. Each pixel may include a pixel electrode with a first sub-pixel electrode PE1 and a second sub-pixel electrode PE2, and also include a spacer 400. The first display substrate 100 may further include a gate insulation layer 130, a passivation layer 160 and an organic layer 170.

The first and second gate lines GL1 and GL2 may each extend in a first direction D1 defined in the first LCD panel 500. The first and second gate lines GL1 and GL2 may be arranged in a sequence extending in a second direction D2. The second direction D2 may be different from the first direction D1. For example, the second direction D2 may be perpendicular to the first direction D1. The gate line GL1 may be adjacent to the gate line GL2. The first gate line GL1 may be connected to the first and second TFTs SW1 and SW2.

The first and second data lines DL1 and DL2 may each extend in the second direction D2. The first and second data lines DL1 and DL2 may be arranged in a sequence extending in the first direction D1. The first data line DL1 may be adjacent to the second data line DL2. The first data line DL1 and the second data line DL2 may intersect the first gate line GL1 and the second gate line GL2.

The first TFT SW1 may be connected to the first gate line GL1 and the second data line DL2. The first TFT SW1 may include a first gate electrode 121a as a control electrode, a first source electrode 151a as an input electrode, a first drain electrode 153a as an output electrode, and a first active pattern 140a. The first gate electrode 121a may be connected to the first gate line GL1, the first source electrode 151a may be connected to the first data line DL2, and the second drain electrode 153a may be spaced from the first source electrode 151a. The second TFT SW2 may be connected to the first gate line GL1 and the first data line DL1. The second TFT SW2 may include a second gate electrode 121b as a control electrode, a second source electrode 151b as an input electrode, a second drain electrode 153b as an output electrode, and a second active pattern 140b. The second gate electrode 121b may be connected to the first gate line GL1, the second source electrode 151b may be connected to the first data line DL1, and the second drain electrode 153b may be spaced from the second source electrode 151b.

In each pixel, each of the first and second sub-pixel electrodes PE1 and PE2 is electrically connected to the first and second TFTs SW1 and SW2. The first sub-pixel electrode PE1 may include first micro-slit patterns 183a including a plurality of micro-electrodes. The second sub-pixel electrode PE2 may include second micro-slit patterns 183b including a plurality of micro-electrodes. Each of the first and second micro-slit patterns 183a and 183b may include a pattern of parallel micro-electrodes separated by parallel slits. The first sub-pixel electrode PE1 includes a first shielding pattern 182a interconnecting end portions of some of the first micro-electrodes of the first micro-slit patterns 183a. The first shielding pattern 182a interconnects the end portions of the micro-electrodes overlapping with the second gate line GL2. In some embodiments, the first shielding pattern 182a may interconnect the end portions of the micro-electrodes overlapping with both the first gate line GL1 and the second gate line GL2.

The slits and the micro-electrodes of the first and second micro-slit patterns 183a, 183b may extend in any direction with respect to the first direction D1 and the second direction D2. For example, the slits and the micro-electrodes may form an angle of about 45° or about 135° with respect to the first gate line GL1. The first micro-electrodes of the first micro-slit patterns 183a may be interconnected by a body portion 181a of the first sub-pixel electrode PE1. The second micro-electrodes 183b may be interconnected by a body portion 181b of the second sub-pixel electrode PE2. The micro-electrodes of the first and second micro-slit patterns 183a and 183b may have substantially the same widths. For example, each finger may have a width of about 2 μm to about 4 μm. The adjacent fingers may be spaced from each other by about 2 μm to about 4 μm.

The first shielding pattern 182a is connected to the end portions of the micro-electrodes of the first micro-slit patterns 183a. The end portions of the first micro-slit patterns 183a may overlap with the second gate line GL2. The first shielding pattern 182a may extend in the first direction D1, i.e. in parallel with the second gate line GL2. The first shielding pattern 182a may overlap with the second gate line GL2. The first shielding pattern 182a may extend across part of the width or the entire width of the second gate line GL2.

The first shielding pattern 182a may shield the micro-electrodes of the first and second micro-slit patterns 183a and 183b from the electric field of the second gate line GL2. The first shielding pattern 182a may thus suppress distortion of liquid crystal directors adjacent to the second gate line GL2. In particular, when the pixel displays a black image, the first shielding pattern 182a will help prevent light leakage, and when the pixel displays a white image, the first shielding pattern 182a will help prevent textured image defects generated by reduced light transmission caused by distortion of the liquid crystal directors.

If the width w of the first shielding pattern 182a is made greater than the cell gap d of the liquid crystal layer 300, then the liquid crystal directors adjacent to the first shielding pattern 182a may be distorted by the first shielding pattern 182a. Therefore, in some embodiments, the width w of the first shielding pattern 182a is less than the cell gap d. For example, in some embodiments, the cell gap d is about 4 μm, and the width w of the first shielding pattern 182a is about 3.5 μm.

The first sub-pixel electrode PE1 may receive a first voltage from the second data line DL2. The second sub-pixel electrode PE2 may receive a second voltage from the first data line DL1. For example, the second voltage may be higher than the first voltage. The first sub-pixel electrode PE1 occupies areas shown as LP, and the second sub-pixel electrode PE2 occupies an area shown as HP.

The first sub-pixel electrode PE1 is electrically connected to the first TFT SW1 by contacting the first drain electrode 153a. The first sub-pixel electrode PE1 includes the first micro-slit patterns 183a and a first contact pattern 185a making contact with the first drain electrode 153a. The first sub-pixel electrode PE1 also includes a first bridge pattern 184a which physically and electrically interconnects the two portions of the sub-pixel electrode PE1 that are located in the respective two areas LP on the opposite sides of the second sub-pixel electrode PE2. The first sub-pixel electrode PE1 may surround the second sub-pixel electrode PE2. The first contact pattern 185a may overlie the first drain electrode 153a and be connected to the adjacent end portions of the micro-electrodes of the first micro-slit patterns 183a. In some embodiments, these end portions form an angle of about 45° with the first gate line GL1.

The first shielding pattern 182a is adjacent to the second gate line GL2 and is connected to the end portions of the micro-electrodes of the first micro-slit patterns 183a adjacent to the second gate line GL2. Although not shown in the figures, a second shielding pattern like 182a may be provided adjacent to the first gate line GL1 to interconnect the end portions of a lower micro-slit patterns 183a adjacent to the first gate line GL1.

The second sub-pixel electrode PE2 is electrically connected to the first TFT SW1 by contacting the second drain electrode 153b. The second sub-pixel electrode PE2 includes the second micro-slit patterns 183b and a second contact pattern 185b making contact with the second drain electrode 153b. The second sub-pixel electrode PE2 is spaced and electrically insulated from the first sub-pixel electrode PE1. The second drain electrode 153b may overlap with the first sub-pixel electrode PE1.

In each pixel, the spacer 400 may be disposed over the first gate line GL1 between the first TFT SW1 and the second TFT SW2. The spacer 400 is capable of constantly maintaining the cell gap d. For example, the spacer 400 may be a column spacer. The spacer 400 may be formed in a light blocking region including any one or more of the first gate line GL1, the second gate line GL2, the first data line DL1, and the second data line DL2. The spacer 400 may be formed over the first gate line GL1 and may overlap with the first sub-pixel electrode PE1. In some embodiments, the first sub-pixel electrode PE1 is wider than the second sub-pixel electrode PE2, and that portion of the sub-pixel electrode PE1 which is not obscured by the spacer 400 is at least as wide as the second sub-pixel PE2.

In the first display substrate 100, the first gate line GL1, the second gate line GL2, the first gate electrode 121a and the second gate electrode 121b are formed on a first base substrate 110, and a gate insulation layer 130 is formed over the first base substrate 110 including the first gate line GL1, the second gate line GL2, the first gate electrode 121a and the second gate electrode 121b. The gate insulation layer 130 underlies the first active pattern 140a and the second active pattern 140b.

The passivation layer 160 is formed in the first display substrate 100 to overlie the first base substrate 110, the first and second data lines DL1 and DL2, the first source electrode 151a, the second source electrode 151b, the first drain electrode 153a and the second drain electrode 153b of the pixel. The organic layer 170 is formed between the passivation layer 160 and the first and second sub-pixel electrodes PE1 and PE2. The organic layer 170 may planarize the first display substrate 100. Contact holes are made in the passivation layer 160 and the organic layer 170 which expose the first drain electrodes 153a and the second drain electrode 153b.

The first opposite substrate 200 includes a black matrix pattern 220, a color filter layer 230, an overcoat layer 240 and a common electrode layer 250 that are formed on a second base substrate 210 facing the first display substrate 100.

The black matrix pattern 220 is formed in the regions opposite to the first and second gate lines GL1 and GL2, the first and second data lines DL1 and DL2, and the TFTs SW1 and SW2. The black matrix pattern 220 may be formed by photolithographically patterning a metal layer or by printing an organic material.

The color filter layer 230 is formed in regions which are separated from each other by the black matrix pattern 220. The color filter layer 230 contains portions that face the sub-pixel electrodes such as PE1 and PE2. The color filter layer 230 may be formed by photolithographically patterning a photosensitive layer of suitable colors or by printing a color organic material.

The overcoat layer 240, if viewed upside down relative to FIG. 2, overlies the second base substrate 210, the black matrix pattern 220, and the color filter layer 230, and underlies the common electrode layer 250. The overcoat layer 240 can planarize the first opposite substrate 200. For example, the overcoat layer may be formed using acryl resin.

The common electrode layer 250 is formed after the overcoat layer 240. The common electrode layer 250 is opposite to the first and second sub-pixel electrodes PE1 and PE2, and may cover the entire second base substrate 210. The common electrode layer 250 may be used to form an electric field between the first display substrate 100 and the first opposite substrate 200 and may be unpatterned. The printed vertical alignment (PVA) mode is provided by the micro-slit patterns 183a and 183b.

Although not shown in the figures, the first LCD panel 500 may also include alignment layers. One of the alignment layers may be formed in the first display substrate 100 over the first base substrate 110 and the sub-pixel electrodes PE1 and PE2. The other one of the alignment layers may be formed in the first opposite substrate 200 over the second base substrate 210 and the common electrode layer 250. The alignment layers bias the liquid crystal molecules of the liquid crystal layer 300 to have pre-tilt angles.

Further, in some embodiments, the first LCD panel 500 includes a first polarizing plate (not shown) and a second polarizing plate (not shown). The first polarizing plate is formed on the first display substrate 100 and has a first polarizing axis arranged in the first direction D1 or the second direction D2. The second polarizing plate is formed on the first opposite substrate 200 and has a second polarizing axis perpendicular to the first polarizing axis. For example, the direction of the first polarizing axis may be the first direction D1, and the direction of the second polarizing axis may be the second direction D2.

Figure 3A:
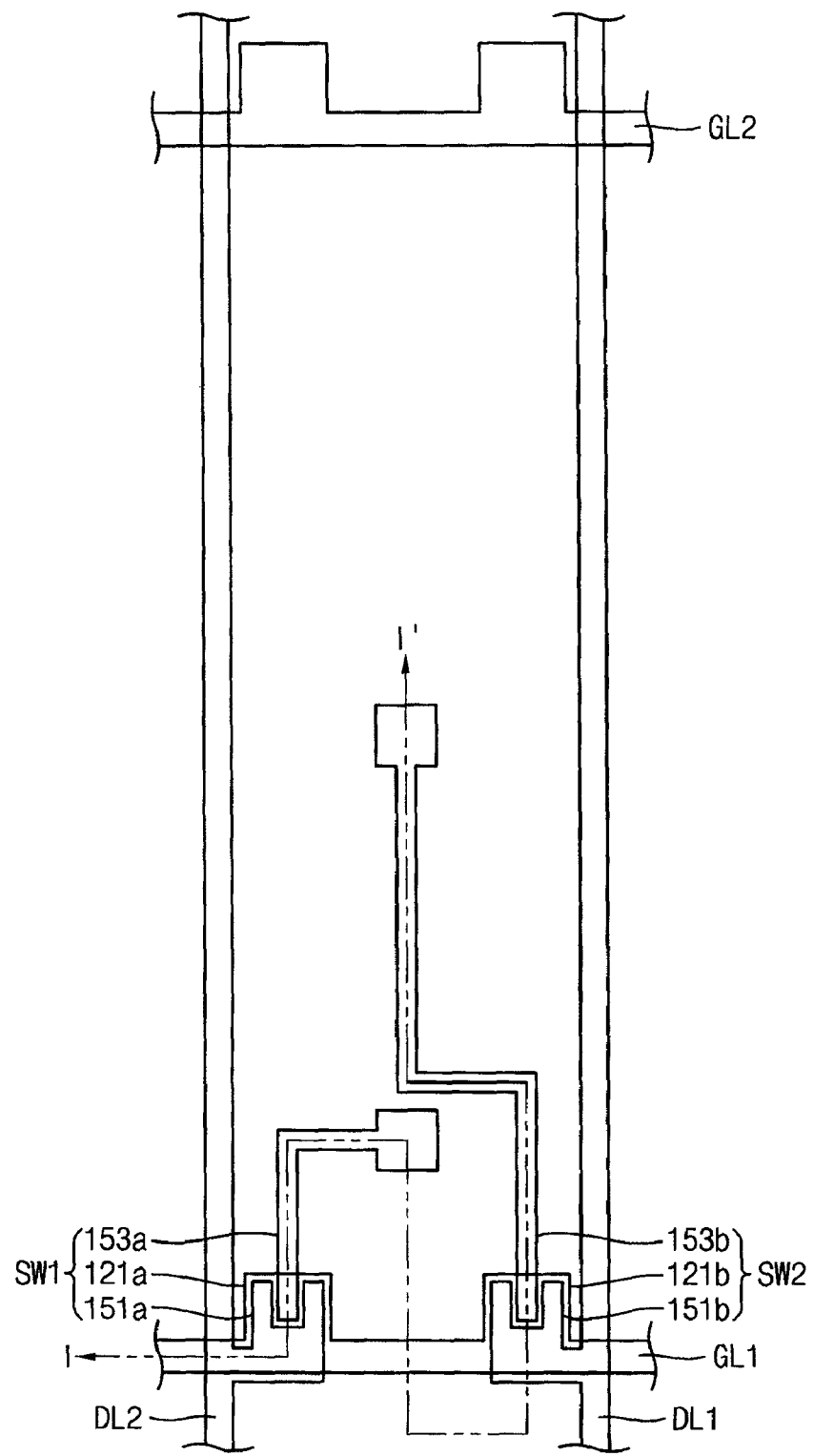
FIGS. 3A and 3C are plan views of a display substrate of an LCD panel of FIGS. 1 and 2 at different stages of fabrication.
Figure 3B:
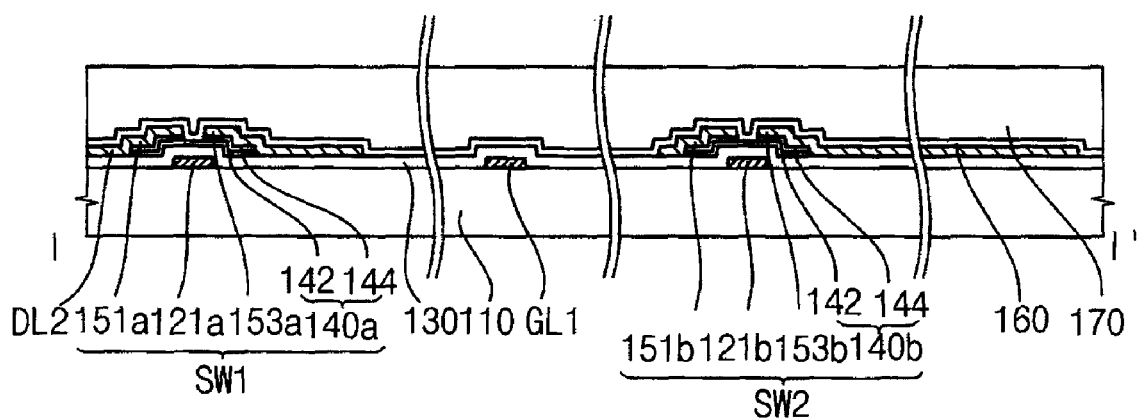
FIGS. 3B and 3D are cross-sectional views of the display substrate of the LCD panel of FIGS. 1 and 2 at different stages of fabrication.
Figure 3C:
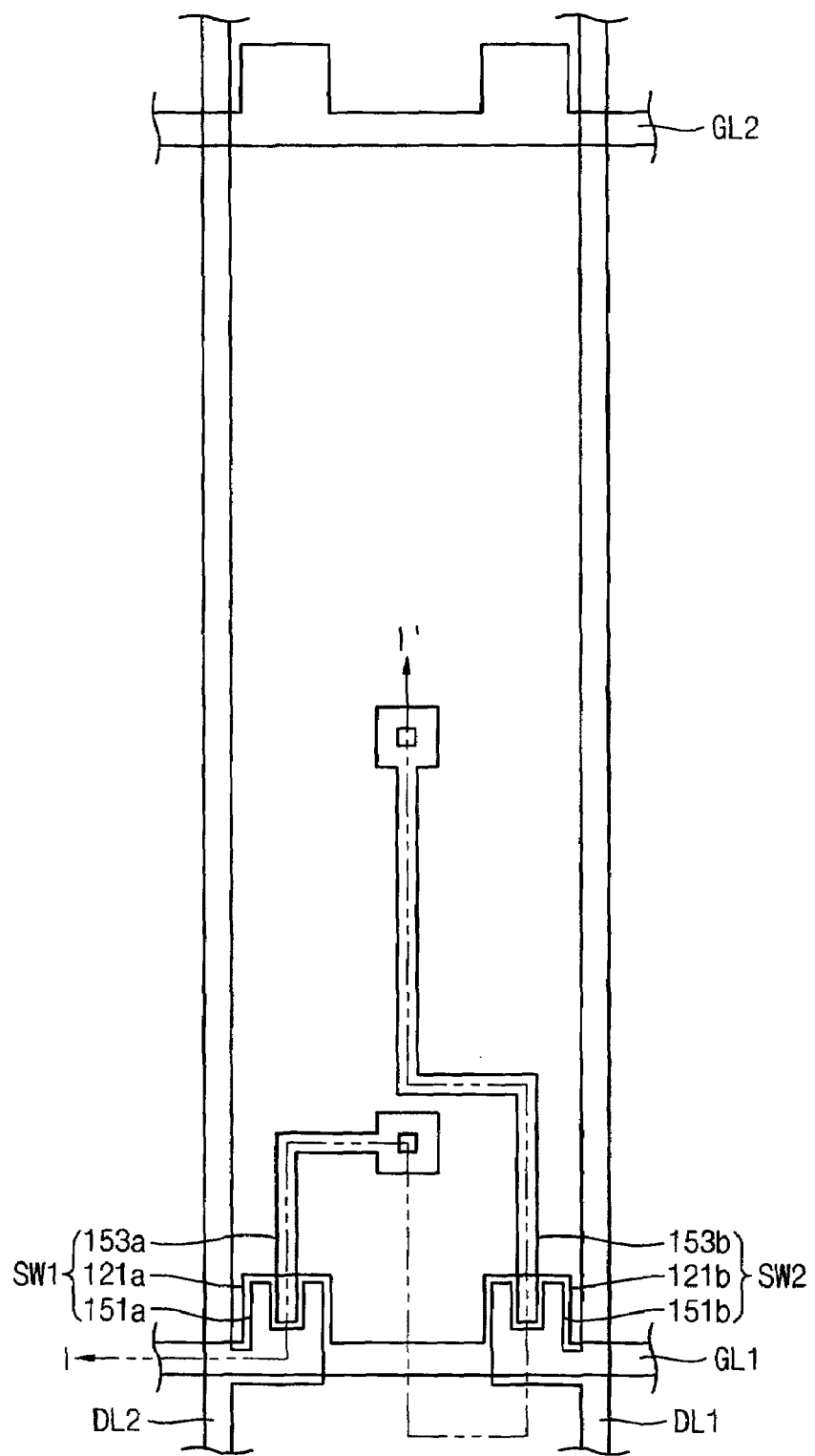
Figure 3D:
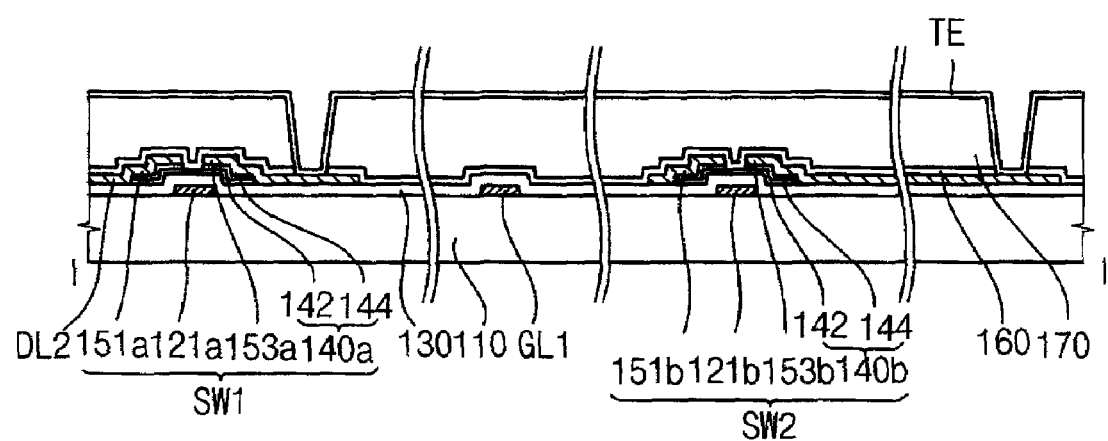

FIGS. 3A to 3D illustrate a method of manufacturing the first display substrate 100 of FIGS. 1 and 2. FIGS. 3A to 3D show the display substrate at different stages of fabrication. FIGS. 3A and 3C are plan views, and FIGS. 3B and 3D are cross-sectional views.

Referring to FIGS. 3A and 3B, the first and second gate lines GL1 and GL2, the first gate electrode 121a, and the second gate electrode 121b are formed on the first base substrate 110. For example, a gate metal layer may be formed on the first base substrate 110, and the gate metal layer may be photolithographically patterned to form the gate lines, the first gate electrode 121a and the second gate electrode 121b.

The gate insulation layer 130 is formed over the first base substrate 110, possibly from silicon nitride, silicon oxide, or another suitable material.

A semiconductor layer 142 and an ohmic contact layer 144 are formed on the first base substrate 110 over the gate insulation layer 130. The semiconductor layer 142 and the ohmic contact layer 144 are patterned to form the first active pattern 140a and the second active pattern 140b. In each pixel, the first active pattern 140a overlies the first gate electrode 121a, and the second active pattern 140b overlies the second gate electrode 121b. Materials for the semiconductor layer 142 include amorphous silicon, and materials for the ohmic contact layer 144 include heavily doped (n+) amorphous silicon. The semiconductor layer 142 and the ohmic contact layer 144 are formed on the gate insulation layer 130 and patterned by a dry etching process to form the first active pattern 140a and the second active pattern 140b.

The first and second data lines, the first and second source electrodes 151a and 151b, and the first and second drain electrodes 153a and 153b are formed on the first base substrate 110 after the first and second active patterns 140a and 140b. For example, a source metal layer may be formed over the active patterns 140a and 140b and be photolithographically patterned into the first and second source electrodes 151a and 151b and the first and second drain electrodes 153a and 153b.

The passivation layer 160 and the organic layer 170 are formed over the first base substrate 110. The passivation layer 160 may be formed, for example, from silicon nitride, silicon oxide, etc. The organic layer 170 may be formed, for example, from a positive type photoresist composition.

Referring to FIGS. 3C and 3D, the organic layer 170 is photolithographically patterned to expose the passivation layer 160 over the first and second drain electrodes 153a and 153b. The exposed passivation layer 160 is etched by a dry etching process to expose the first and second drain electrodes 153a and 153b.

A transparent electrode layer TE is formed in first display substrate 100 over the first base substrate 110, the first and second drain electrodes 153a and 153b, and the passivation layer 160 and the organic layer 170. The transparent electrode layer TE is photolithographically patterned to form the first and second sub-pixel electrodes PE1 and PE2 and also to form the first shielding pattern 182a. The first contact pattern 185a of the first sub-pixel electrode PE1 makes contact with the first drain electrode 153a, and the second contact pattern 185b makes contact with the second drain electrode 153b. The first shielding pattern 185a is connected to the end portions of micro-electrodes of the micro-slit patterns 183a which end portions overlap with the second gate line GL2. The transparent electrode layer TE can be made, for example, from indium tin oxide, indium zinc oxide, etc.

Figure 4A:
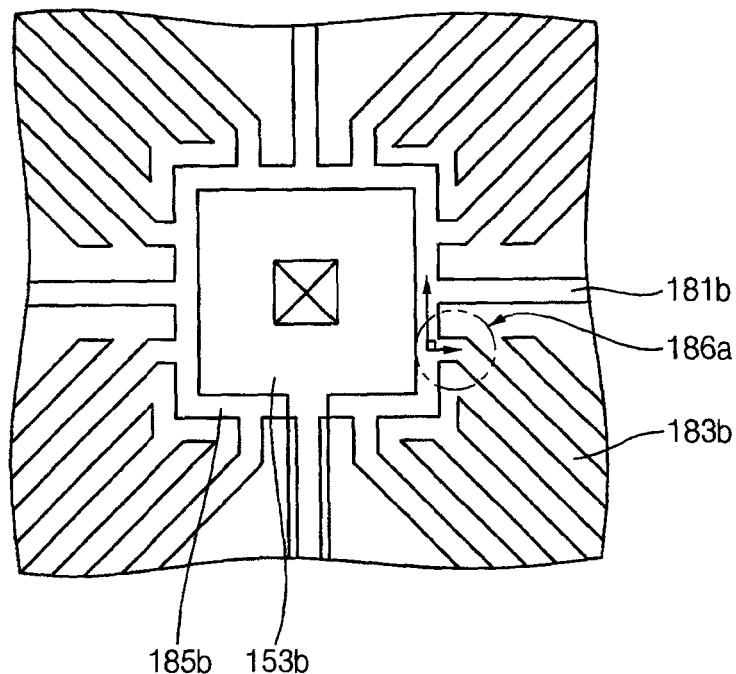
FIGS. 4A and 4B are enlarged plan views of structures providing connections between micro-slit patterns' micro-electrodes and a contact pattern.
Figure 4B:
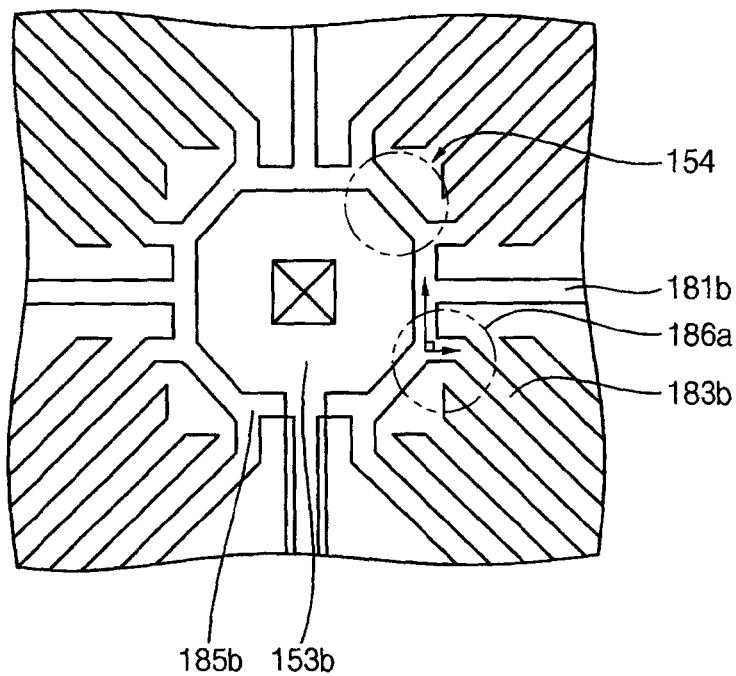

FIGS. 4A and 4B are enlarged plan views of structures providing connection between the micro-slit patterns' micro-electrodes and the contact pattern. Each of these figures illustrates a possible geometry for the second contact pattern 185b and the adjacent second micro-slit patterns 183b in the second sub-pixel electrode PE2. The second micro-slit pattern 183b shown in FIGS. 4A and 4B includes one or more micro-electrodes (e.g. two micro-electrodes) each of which is connected to the second contact pattern 185b by a respective first connecting pattern 186a, which meets the second contact pattern 185b at an angle of about 90°. Some of the first connecting patterns 186a extend in the direction of the first polarizing axis (e.g. the first direction D1), while the other first connecting patterns 186a extend in the direction of the second polarizing axis (e.g. the second direction D2). In some embodiments, the first connecting patterns 186a act to provide better correspondence between the directions of the first and second polarizing axes on the one hand and the directions of the liquid crystal directors at the connecting portions between the second contact pattern 185b and the micro-electrodes of the second micro-slit patterns 183b on the other hand, to suppress the textured image defects.

In each of FIGS. 4A and 4B, the second contact pattern 185b has four sides, two of which extend in the first direction D1 and the other two of which extend in the second direction D2. The first connecting features 186a meet the respective sides at an angle of about 90°. In FIG. 4A, the second contact pattern 185b is rectangular, but in FIG. 4B the second contact pattern 185b is octagonal due to chamfered corners 154 which repeat the chamfered-corner shape of the second drain electrode 153b. The chamfered corners smoothen the transition of the liquid crystal directors from a direction corresponding to the first direction D1 to a direction corresponding to the second direction D2, thus further helping to suppress the textured image defects.

Other first connecting pattern 186a (not shown) can be used to connect the first contact pattern 185a to the fingers of the first micro-slit patterns 183a. The connection structures can be as in FIG. 4A or 4B.

Example Embodiment 2

Figure 5:
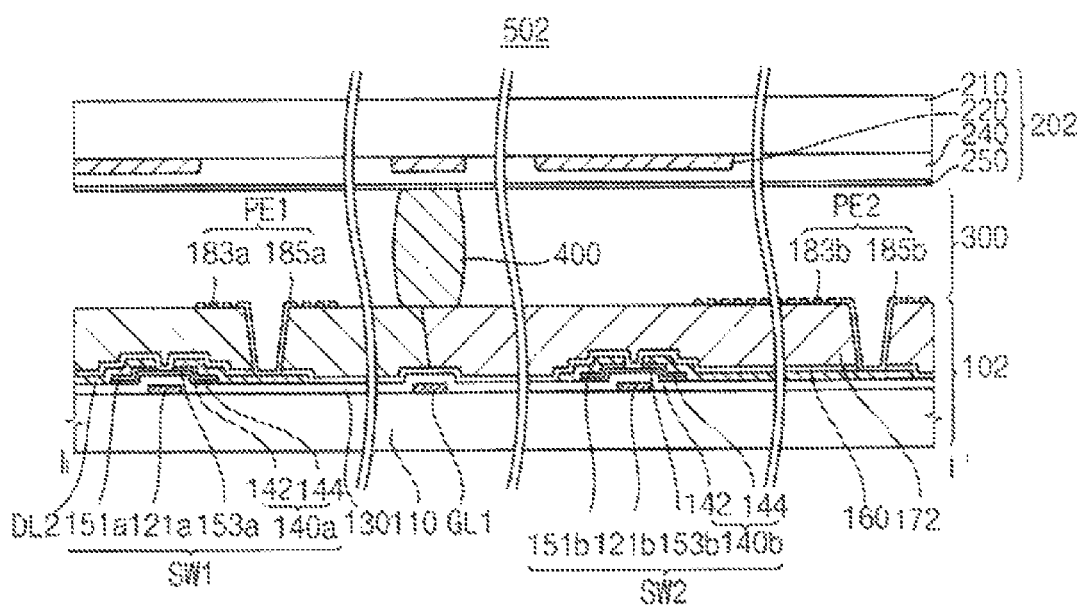
FIG. 5 is a cross-sectional view illustrating an LCD panel in accordance with Embodiment 2 of the present invention.

FIG. 5 is a cross-sectional view illustrating an LCD panel 502 in accordance with Embodiment 2 of the present invention.

The LCD panel 502 is substantially identical to the LCD panel 500 of FIGS. 1 and 2, and can be manufactured by substantially the same method (see FIGS. 3A to 3D), except for a color filter layer 172 replacing both the organic layer 170 and the color filter layer 230 of FIG. 2. Redundant description will therefore be avoided.

Referring to FIG. 5, the LCD panel 502 includes a second display substrate 102 with the color filter layer 172, a second opposite substrate 202 facing the second display substrate 102, and a liquid crystal layer 300.

In the second display substrate 102, each pixel includes a first TFT SW1, a second TFT SW2, a first sub-pixel electrode PE1 and a second sub-pixel electrode PE2. The second display substrate 102 also includes a passivation layer 160 and the color filter layer 172. The color filter layer 172 is formed on the passivation layer 160 which covers the first and second TFTs SW1 and SW2. The color filter layer 172 may planarize the second display substrate 102. The color filter layer 172 may be formed using color photoresist. For example, the color filter layer 172 may be a photographically patterned layer of color photoresist. Alternatively, the color filter layer 172 may be formed by inkjet deposition of a color ink.

The first sub-pixel electrode PE1 includes first micro-slit patterns 183a, and the second sub-pixel electrode PE2 includes second micro-slit patterns 183b. End portions of the micro-electrodes of the first micro-slit patterns 183a adjacent to a second gate line GL2 may be interconnected by a first shielding pattern 182a (see FIG. 1).

The second opposite substrate 202 includes a second base substrate 210 formed on which are a black matrix pattern 220, an overcoat layer 240 and a common electrode layer 250. The common electrode layer 250 is formed between the second base substrate 210 and the overcoat layer 240.

The LCD panel 502 of Embodiment 2 may be simpler to fabricate than the LCD panel 500 because in the LCD panel 502 the color filter layer 172 replaces both the organic layer 170 and the color filter layer 230 of FIG. 2, and the reliability of the alignment between the second display substrate 102 and the second opposite substrate 202 may be improved. In addition, Embodiment 2 provides some of the same advantages as Embodiment 1. More particularly, the fabrication may be simplified by providing the first and second sub-pixel electrodes PE1 and PE2 with the first and second micro-slit patterns 183a and 183b and by omitting the process of patterning the common electrode layer 250. Further, the first shielding patterns 182a suppress the distortion of the liquid crystal directors. Also, the first shielding pattern 182a may suppress light leakage and textured image defects to improve display quality.

Example Embodiment 3

Figure 6:
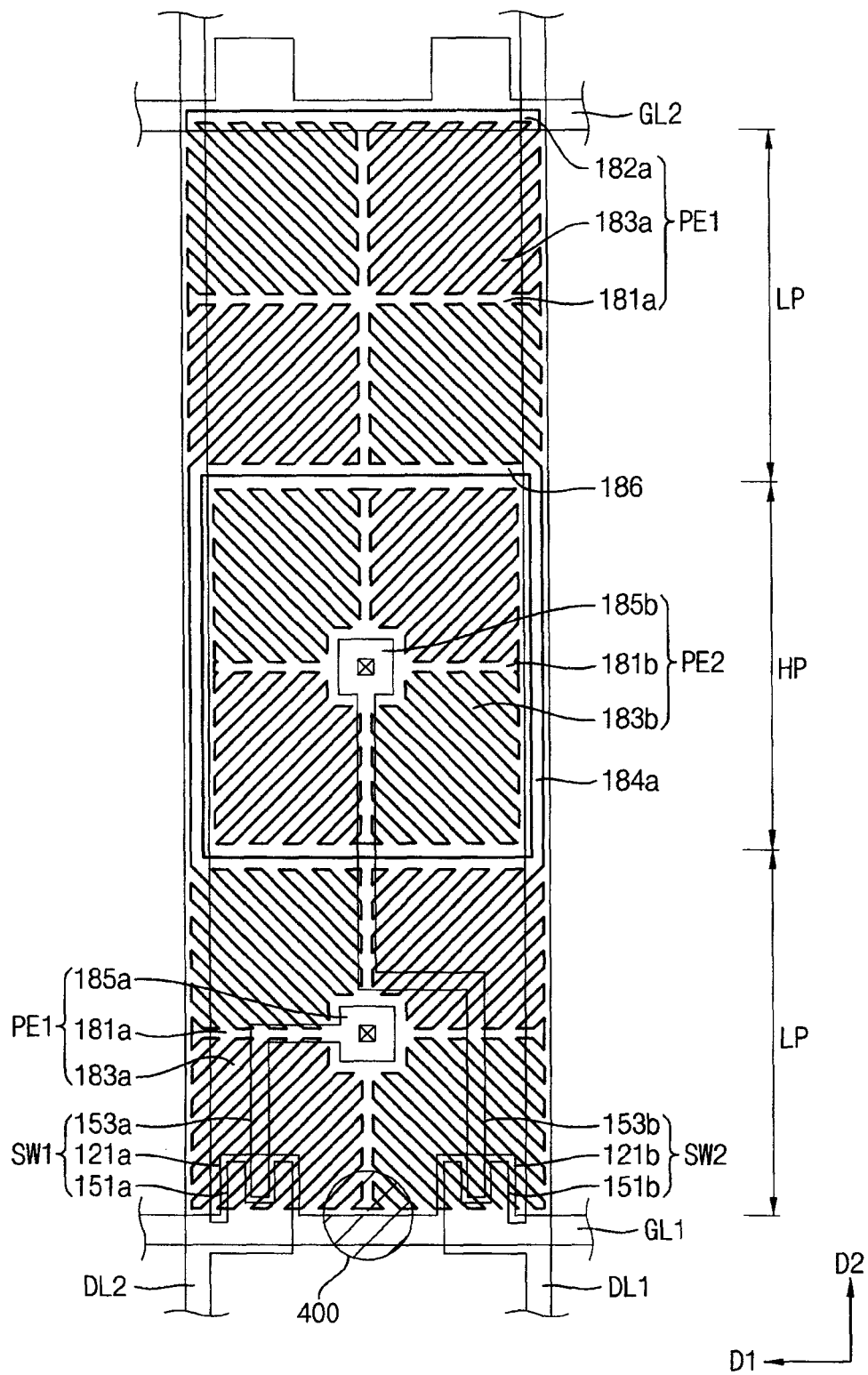
FIG. 6 is a plan view illustrating a display substrate in accordance with Embodiment 3 of the present invention.

FIG. 6 is a plan view illustrating a display substrate 103 in accordance with Embodiment 3 of the present invention.

The display substrate 103 is substantially identical to the first display substrate 100 of FIGS. 1 and 2, and can be manufactured by substantially the same method (see FIGS. 3A to 3D), except for a second shielding feature 186. Thus, redundant description will be avoided.

In the display substrate 103 of FIG. 6, each pixel includes a pixel electrode including a first sub-pixel electrode PE1 connected to a first TFT SW1 and a second sub-pixel electrode PE2 connected to a second TFT SW2.

In the first sub-pixel electrode PE1, the end portions of the micro-electrodes of the first micro-slit patterns 183a adjacent to a second gate line GL2 may be interconnected by a first shielding pattern 182a. Adjacent to the second sub-pixel electrode PE2, the end portions of the fingers of the first micro-slit patterns 183a may be interconnected by a second shielding pattern 186.

The liquid crystal directors of the liquid crystal molecules adjacent to the boundary between the first sub-pixel electrode PE1 and the second sub-pixel electrode PE2 may be distorted by the voltage difference between the first sub-pixel electrode PE1 and the second sub-pixel electrode PE2, since the first sub-pixel electrode PE1 receives a lower voltage than the second sub-pixel electrode PE2. The second shielding pattern 186 at the boundary may prevent the electric field lines reaching the first sub-pixel electrode PE1 from extending along the micro-electrodes of the first micro-slit patterns 183a, and thus may suppress the distortion of the liquid crystal directors.

Example Embodiment 4

Figure 7:
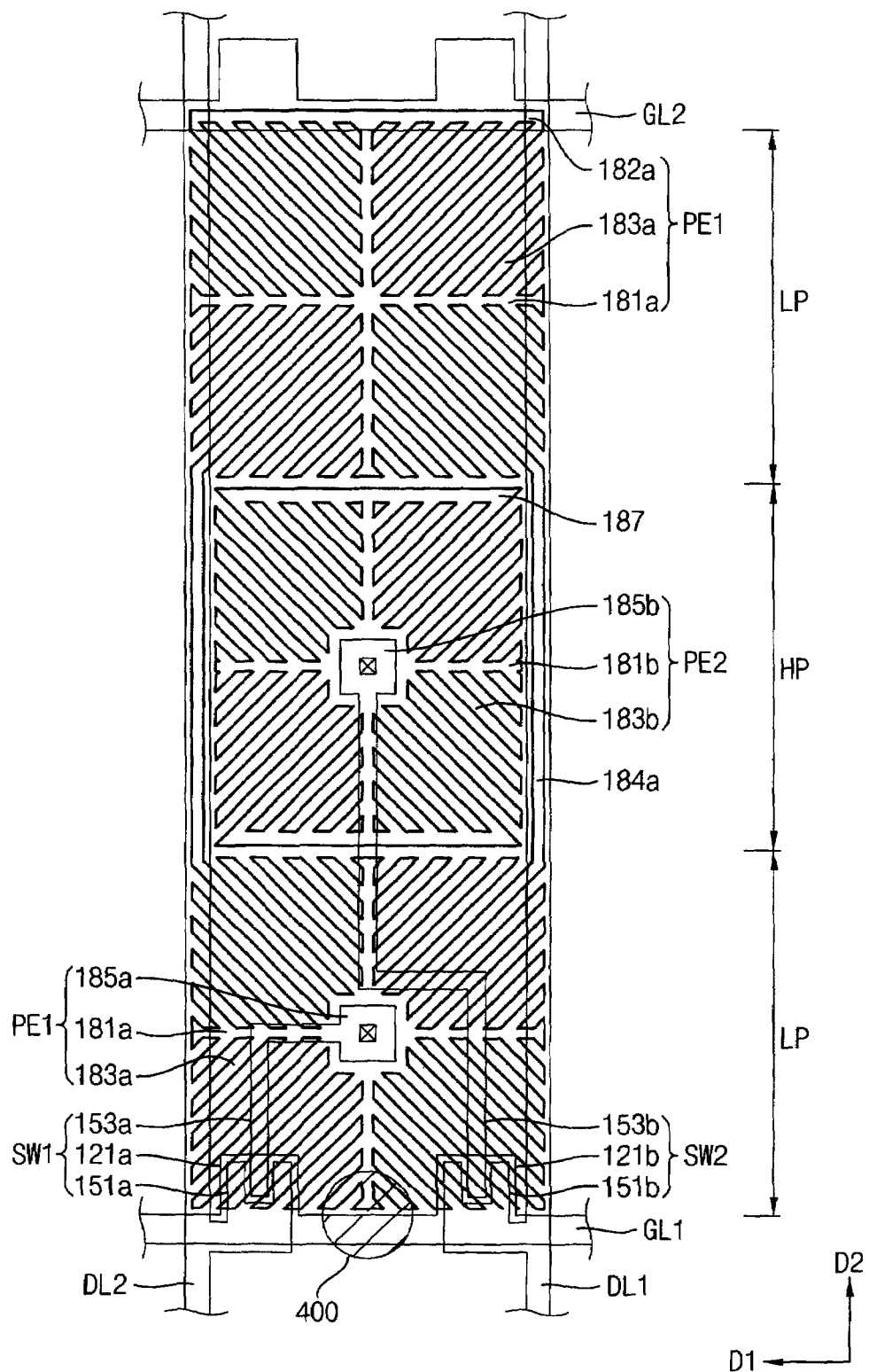
FIG. 7 is a plan view illustrating a display substrate in accordance with Embodiment 4 of the present invention.

FIG. 7 is a plan view illustrating a display substrate 104 in accordance with Embodiment 4 of the present invention.

The display substrate 104 is substantially identical to the display substrate 100 shown in FIGS. 1 and 2, and can be manufactured by substantially the same method (see FIGS. 3A to 3D) except for a third shielding pattern 187. Redundant description will therefore be avoided.

Referring to FIG. 7, each pixel electrode of a display substrate 104 includes a first sub-pixel electrode PE1 connected to a first TFT SW1 and a second sub-pixel electrode PE2 connected to a second TFT SW2.

In the first sub-pixel electrode PE1, end portions, adjacent to the second gate line GL2, of the micro-electrodes of the first micro-slit patterns 183a may be interconnected by the first shielding pattern 182a. Adjacent to the first sub-pixel electrode PE1, end portions of the micro-electrodes of the second micro-slit patterns 183b of the second sub-pixel electrode PE2 may be interconnected by a third shielding pattern 187.

Liquid crystal directors of the liquid crystal molecules adjacent to the boundary between the first sub-pixel electrode PE1 and the second sub-pixel electrode PE2 may be distorted by the voltage difference between the first sub-pixel electrode PE1 and the second sub-pixel electrode PE2, since the first sub-pixel electrode PE1 receives a lower voltage than the second sub-pixel electrode PE2. The third shielding pattern 187 at the boundary may prevent the electric field lines reaching the second sub-pixel electrode PE2 from extending along the micro-electrodes of the second micro-slit patterns 183b, and thus may suppress the liquid crystal directors from being distorted.

In some embodiments (not shown in figures), each pixel includes both the second shielding pattern 186 of FIG. 6 and the third shielding pattern 187 of FIG. 7 to suppress distortion of the liquid crystal directors and hence generation of textured image defects.

Example Embodiment 5

Figure 8:
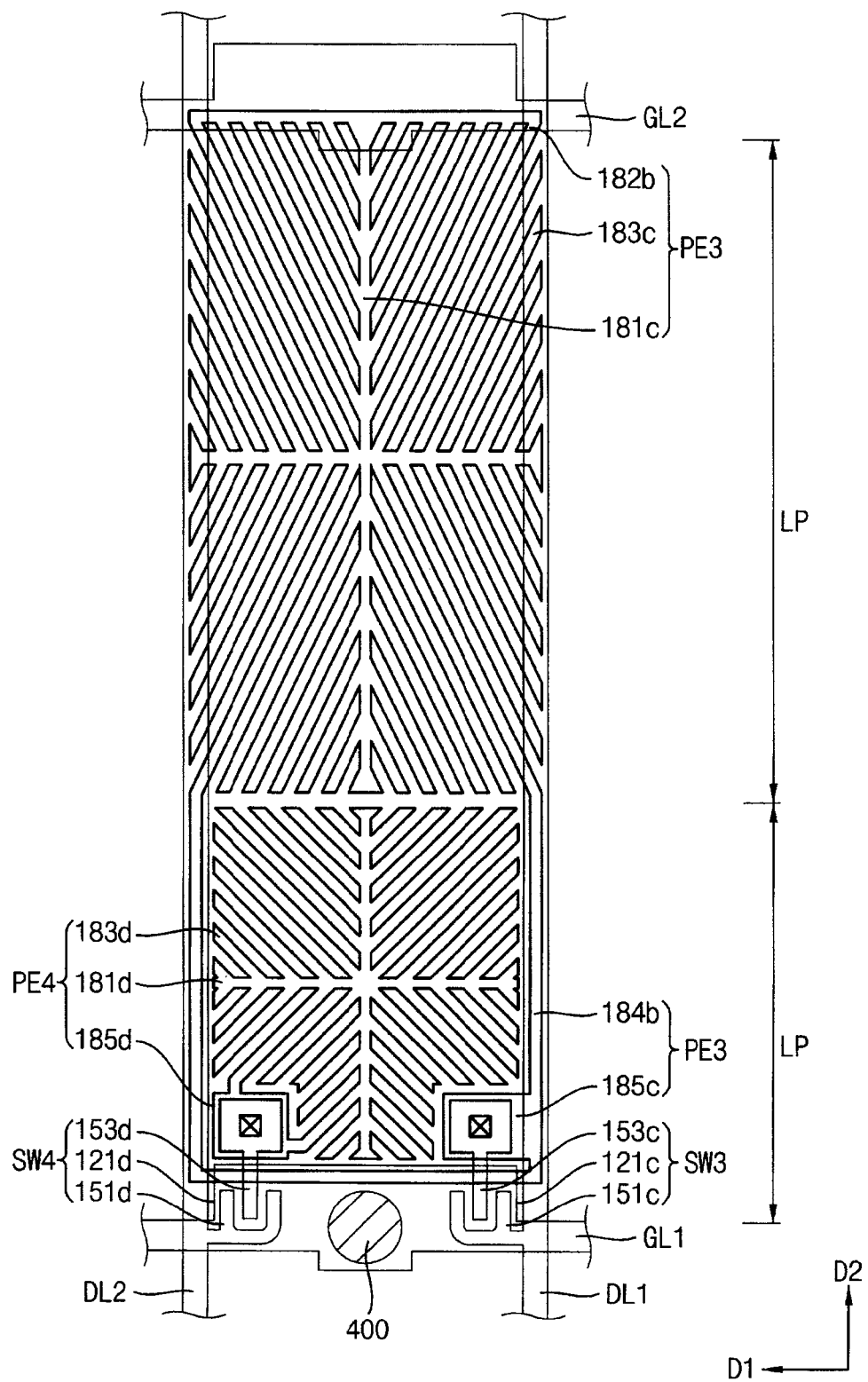
FIG. 8 is a plan view illustrating a display panel in accordance with Embodiment 5 of the present invention.

FIG. 8 is a plan view illustrating an LCD panel 505 in accordance with Embodiment 5 of the present invention.

The LCD panel 505 is substantially identical to the LCD panel 500 shown in FIGS. 1 and 2, and can be manufactured by substantially the same method (see FIGS. 3A to 3D), except for the following patterns. Instead of the sub-pixel electrodes PE1, PE2 and the first shielding pattern 182a of FIG. 1, each pixel electrode of the LCD panel 505 of FIG. 8 contains a third sub-pixel electrode PE3, a fourth sub-pixel electrode PE4, and a fourth shielding pattern 182b. The elements PE3, PE4, 182b of FIG. 8 perform the same functions as the respective elements PE1, PE2, 182a of FIG. 1. Redundant description will be avoided.

Referring to FIG. 8, the fifth LCD panel 505 includes a third TFT SW3, a fourth TFT SW4, the third sub-pixel electrode PE3 connected to the third TFT SW3, the fourth sub-pixel electrode PE4 connected to the fourth TFT SW4, and a spacer 400. The third and fourth TFTs SW3 and SW4 may be connected to a first gate line GL1, a second gate line GL2, a first data line DL1 and a second data line DL2. The sub-pixel electrode PE3 includes a plurality of micro-slit patterns 183c. The sub-pixel electrode PE4 includes a plurality of micro-slit patterns 183d. Each micro-slit pattern 183c, 183d includes a pattern of parallel micro-electrodes separated by parallel slits.

The slits and micro-electrodes of each micro-slit pattern 183c, 183d may extend in any direction with respect to the first direction D1 and the second direction D2. The micro-electrodes of a micro-slit pattern or patterns 183c may be interconnected by a body portion 181c of the third sub-pixel electrode PE3. The micro-electrodes of a micro-slit pattern or patterns 183d may be interconnected by a body portion 181d of the fourth sub-pixel electrode PE4.

The third TFT SW3 may be adjacent to the intersection of the first gate line GL1 and the first data line DL2. The fourth TFT SW4 may be adjacent to the intersection of the first gate line GL1 and the second data line DL2. The fourth sub-pixel electrode PE4 may be adjacent to the first gate line GL1 and the third and fourth TFTs SW3 and SW4. The third sub-pixel electrode PE3 may be adjacent to the second gate line GL2 and be spaced from the fourth sub-pixel electrode PE4.

The third TFT SW3 may be electrically connected to the third sub-pixel electrode PE3. The third TFT SW3 may include a third gate electrode 121c connected to the first gate line GL1, a third source electrode 151c connected to the first data line DL1, a third drain electrode 153c spaced from the third source electrode 151c, and a third active pattern (not shown). The third drain electrode 153c may make contact with a third contact pattern 185c of the third sub-pixel electrode PE3 to electrically interconnect the third TFT SW3 and the third sub-pixel electrode PE3. The third contact pattern 185c may be electrically connected to the micro-electrodes of the third micro-slit patterns 183c by a second bridge pattern 184b. The second bridge pattern 184b may surround the fourth sub-pixel electrode PE4. In some embodiments, the third drain electrode 153c does not overlap with the fourth sub-pixel electrode PE4.

In the third micro-slit patterns 183c, the micro-electrodes' end portions adjacent to the second gate line GL2 may be interconnected by the fourth shielding pattern 182b. The fourth shielding pattern 182b may prevent an electric field extension from the second gate line GL2 into the third sub-pixel electrode PE3 along the micro-electrodes of the third micro-slit patterns 183c.

The fourth TFT SW4 may include a fourth gate electrode 121d connected to the first gate line GL1, a fourth source electrode 151d connected to the second data line DL2, a fourth drain electrode 153d spaced from the fourth source electrode 151d, and a fourth active pattern (not shown). The fourth drain electrode 153d may make contact with a fourth contact pattern 185d of the fourth sub-pixel electrode PE4 to electrically interconnect the fourth TFT SW4 and the fourth sub-pixel electrode PE4. The fourth contact pattern 185d may be electrically connected to the micro-electrodes of the fourth micro-slit patterns 183d.

Figure 9A:
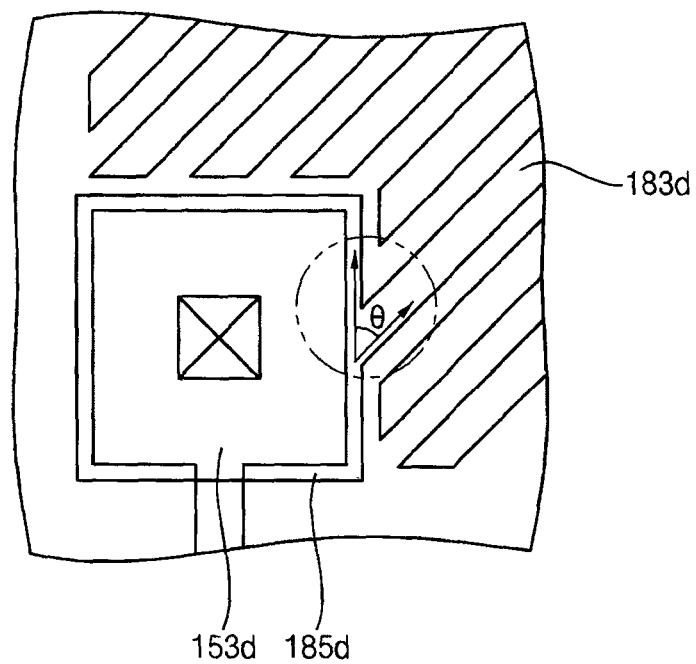
FIGS. 9A and 9B are enlarged plan views of structures providing connections between micro-slit patterns' micro-electrodes and a contact pattern for display panels as in FIG. 8.
Figure 9B:
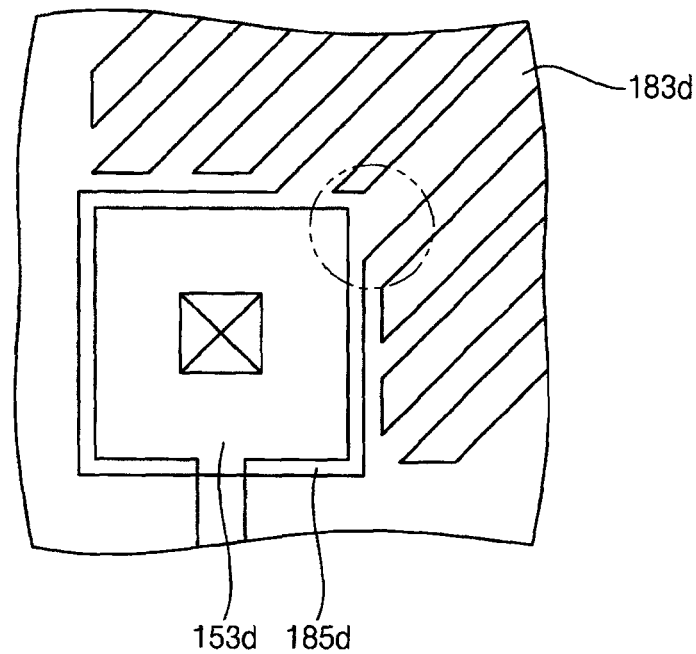

FIGS. 9A and 9B are enlarged plan views illustrating possible connections between the contact pattern 185d and the micro-electrodes of the fourth micro-slit patterns 183d.

Referring to FIG. 9A, the fourth contact pattern 185d is connected to the adjacent end portions of one or more micro-electrodes of one or more of the fourth micro-slit patterns 183d. Each micro-electrode extends at an angle of about 45° with respect to the first gate line GL1, and may meet a respective side of the fourth contact pattern 185d at an angle of about 45°.

Referring to FIG. 9B, the fourth contact pattern 185d has one or more corners connected to the end portions of one or more micro-electrodes of one or more of the fourth micro-slit patterns 183d. In some embodiments, only the corner or corners (but not the sides) are connected to the micro-electrodes. Each corner is a meeting point for the liquid crystal molecules with directors along the first direction D1 and the liquid crystal molecules with directors along the second direction D2. Connecting a corner to a micro-electrode of fourth micro-slit patterns 183d helps suppress the distortion of the liquid crystal directors.

Figure 10A:
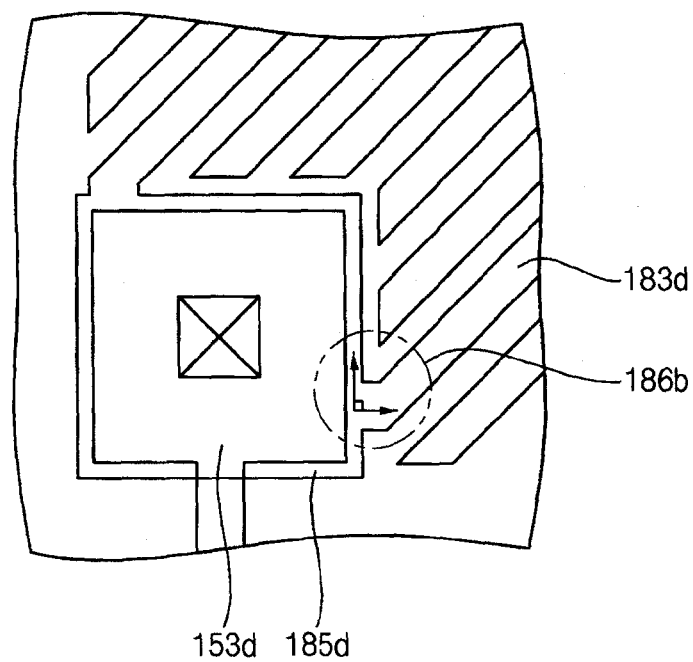
FIGS. 10A and 10B are enlarged plan views of other possible structures providing connections between micro-slit patterns' micro-electrodes and a contact pattern.
Figure 10B:
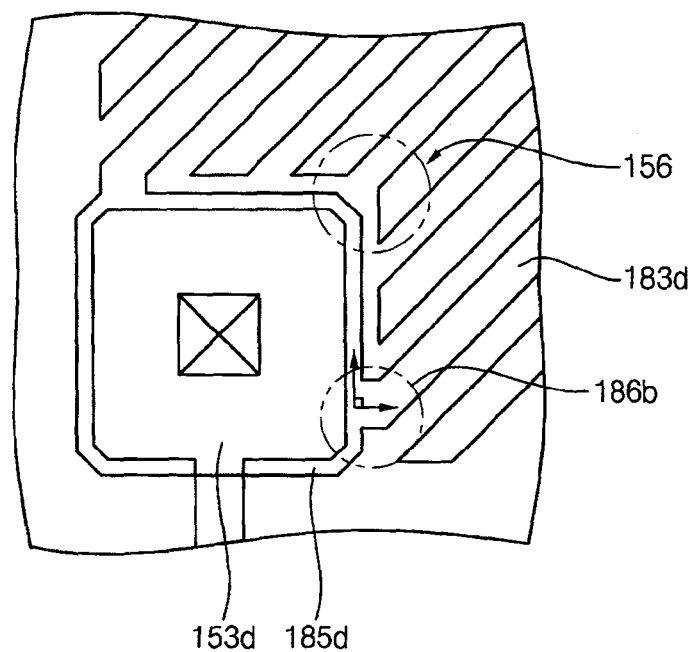

FIGS. 10A and 10B are enlarged plan views illustrating other possible connections between a contact pattern and micro-electrodes of micro-slit patterns. These possible connections are substantially identical to the connection structure shown in FIG. 9A except as described below. Redundant description will be avoided.

Referring to FIG. 10A, the fourth sub-pixel electrode PE4 may further include one or more second connecting patterns 186b each of which interconnects the fourth contact pattern 185d and the adjacent end portion of a respective micro-electrode of a respective fourth micro-slit pattern 183d. A second connecting pattern 186b may extend in the direction of the first polarizing axis or the second polarizing axis, and may meet a side of the fourth contact pattern 185d at an angle of about 90°. The respective side may extend, for example, in the first direction D1 or the second direction D2.

The direction of the liquid crystal directors may correspond to the direction of the first or second polarizing axis at each interconnection between the fourth contact pattern 185d and a micro-electrode of fourth micro-slit patterns 183d, thus reducing textured image defects.

Referring to FIG. 10B, the connection structure of FIG. 10B is as in FIG. 10A but in addition the fourth drain electrode 153d has chamfered corners. The fourth contact pattern 185d may also have chamfered corners whose contour follows the chamfered corners of the fourth drain electrode 153d.

The chamfered corners of the fourth drain electrode 153d and the fourth contact pattern 185d help suppress the distortion of the liquid crystal directors at the corners because the corners are the meeting points between liquid crystal molecules with directors along the first direction D1 and liquid crystal molecules with directors along the second direction D2. Thus, textured image defects due to such distortion are suppressed.

Example Embodiment 6

Figure 11:
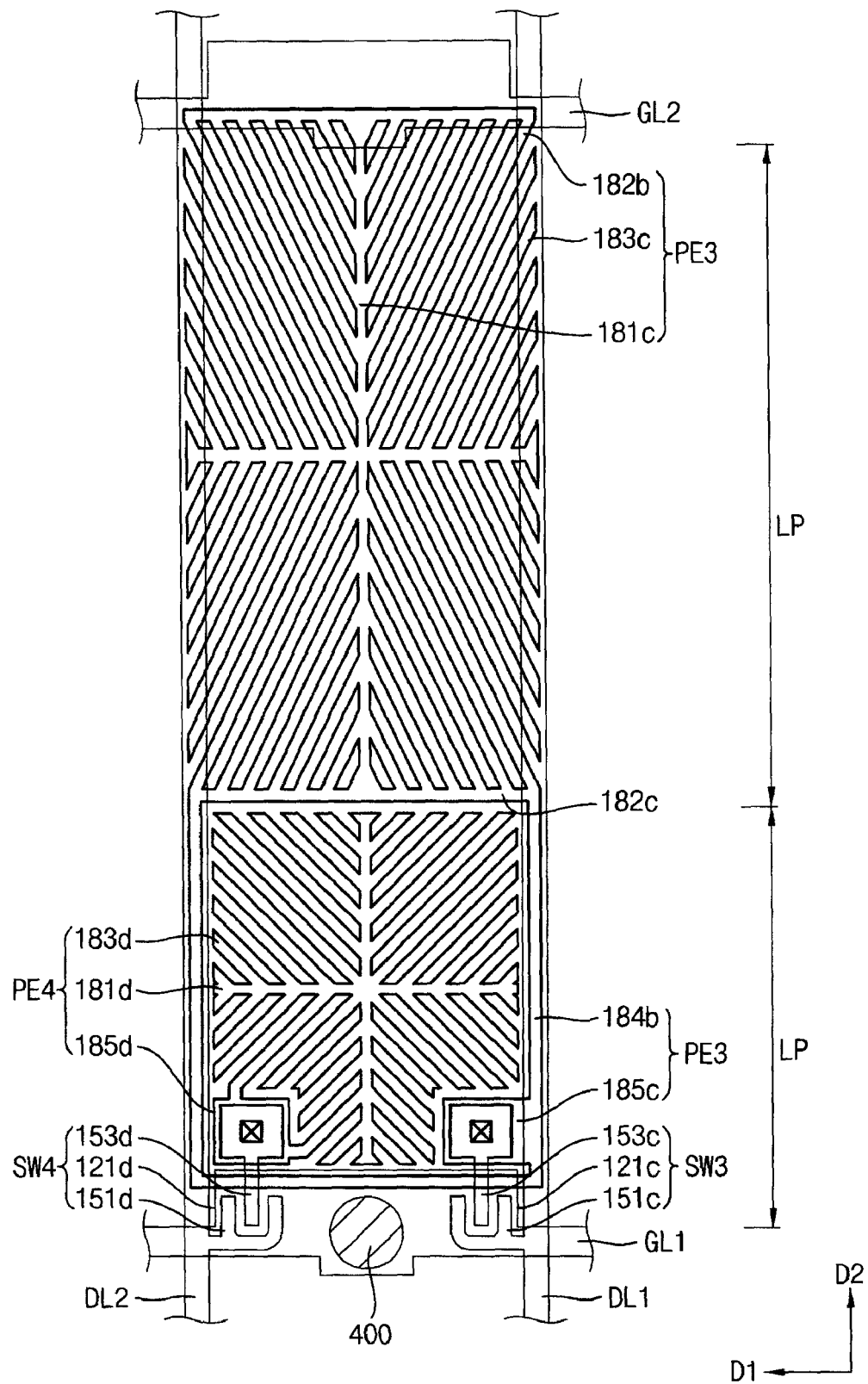
FIG. 11 is a plan view illustrating a display substrate in accordance with Embodiment 6 of the present invention.

FIG. 11 is a plan view illustrating a display substrate 106 for an LCD panel in accordance with Embodiment 6 of the present invention.

In FIG. 11, this LCD panel is substantially identical to the LCD panel 505 shown in FIG. 8, and the display substrate 106 can be manufactured by substantially the same method (see FIGS. 3A to 3D) as the display substrate of FIG. 8, except for a fifth shielding pattern 182c. Redundant description will be avoided.

Referring to FIG. 11, the sixth display substrate 106 includes a third sub-pixel electrode PE3 electrically connected to a third TFT SW3 and includes a fourth sub-pixel electrode PE4 electrically connected to a fourth TFT SW4. In micro-electrodes of third micro-slit patterns 183c of the third sub-pixel electrode PE3, the end portions adjacent to a second gate line GL2 may be interconnected by a fourth shielding pattern 182b. The micro-electrodes' end portions adjacent to the fourth sub-pixel electrode PE4 may be interconnected by a fifth shielding pattern 182c.

Liquid crystal directors of the liquid crystal molecules adjacent to the boundary between the third sub-pixel electrode PE3 and the fourth sub-pixel electrode PE4 may be distorted by the voltage difference between the third sub-pixel electrode PE3 and the fourth sub-pixel electrode PE4, since the third sub-pixel electrode PE3 receives a lower voltage than the fourth sub-pixel electrode PE4. The fifth shielding pattern 182c formed at the boundary may prevent electric field lines reaching the third sub-pixel electrode PE3 from extending into the third sub-pixel electrode PE3 along the micro-electrodes of the third micro-slit patterns 183c, thus suppressing distortion of the liquid crystal directors.

Example Embodiment 7

Figure 12:
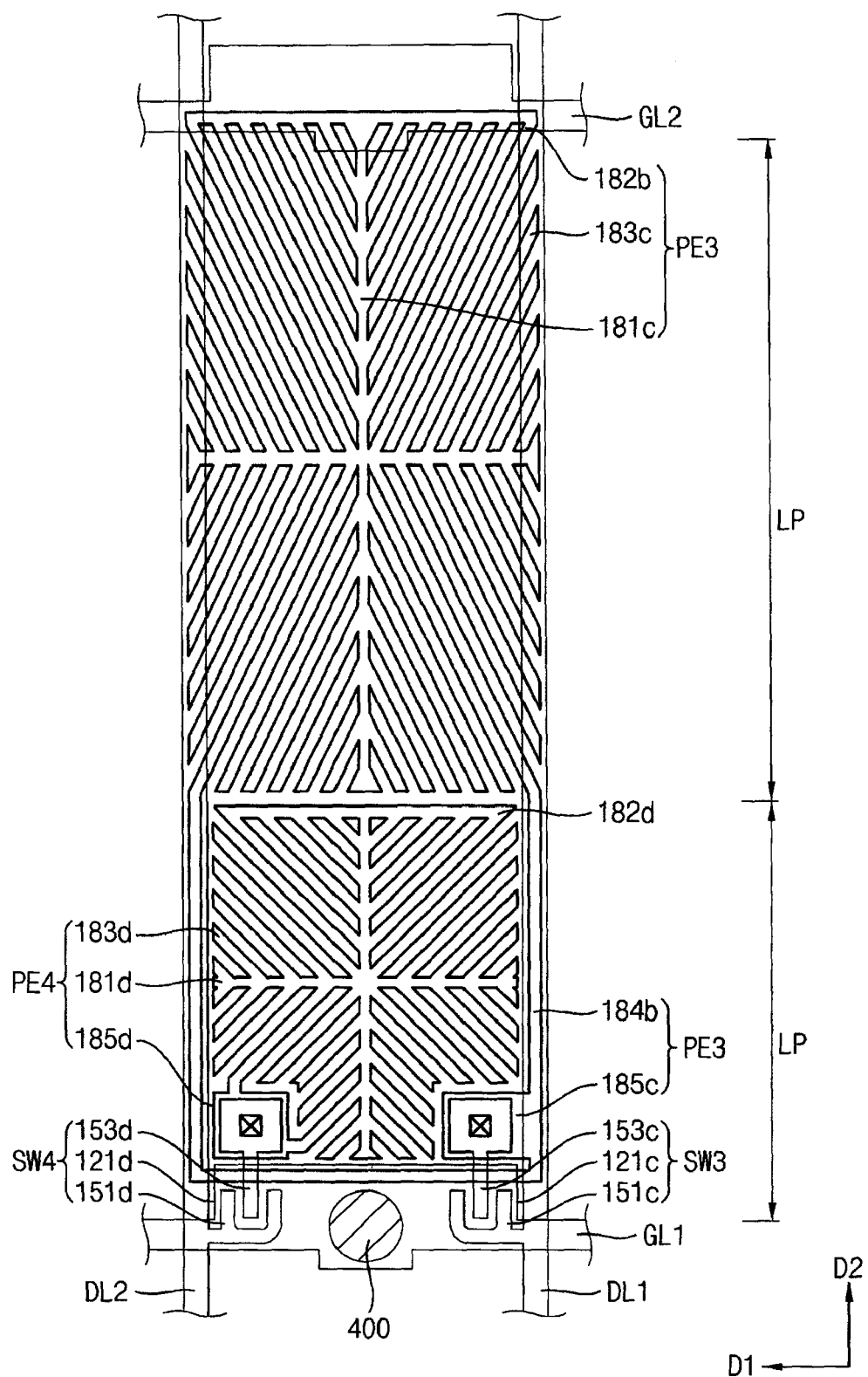
FIG. 12 is a plan view illustrating a display substrate in accordance with Embodiment 7 of the present invention.

FIG. 12 is a plan view illustrating a display substrate 107 for an LCD panel in accordance with Embodiment 7 of the present invention.

In FIG. 12, this LCD panel is substantially identical to the fifth LCD panel 505 shown in FIG. 8, and the display substrate 107 can be manufactured by substantially the same method as the display substrate 100 of Embodiment 1 (see FIGS. 3A to 3D), except for a sixth shielding pattern 182d. Redundant description with be avoided.

Referring to FIG. 12, a seventh display substrate 107 includes a third sub-pixel electrode PE3 electrically connected to a third TFT SW3 and includes a fourth sub-pixel electrode PE4 electrically connected to a fourth TFT SW4. In third micro-slit patterns 183c of the third sub-pixel electrode PE3, the micro-electrodes' end portions adjacent to a second gate line GL2 may be interconnected by a fourth shielding pattern 182b. In the fourth micro-slit patterns 183d, the micro-electrodes' end portions adjacent to the third sub-pixel electrode PE3 may be interconnected by a sixth shielding pattern 182d. Liquid crystal directors of the liquid crystal molecules adjacent to the boundary between the third sub-pixel electrode PE3 and the fourth sub-pixel electrode PE4 may be distorted by the voltage difference between the third sub-pixel electrode PE3 and the fourth sub-pixel electrode PE4, since the third sub-pixel electrode PE3 receives a lower voltage than the fourth sub-pixel electrode PE4. The sixth shielding pattern 182d formed at the boundary may prevent electric field lines reaching the fourth sub-pixel electrode PE4 from extending into the fourth sub-pixel electrode PE4 along the micro-electrodes of the fourth micro-slit patterns 183d, thus suppressing distortion of the liquid crystal directors.

In some embodiments (not shown in the figures), each pixel includes both the fifth shielding pattern 182c of FIG. 11 and the sixth shielding pattern 182d of FIG. 12. The fifth and sixth shielding patterns 182c, 182d help suppress the distortion of the liquid crystal directors and the resulting textured image defects.

According to some embodiments of the present invention, a first shielding pattern interconnects the end portions of the micro-slit patterns' micro-electrodes to electrically shield the pixel electrode from the gate lines and thus to prevent distortion of liquid crystal directors. A second shielding pattern or the third shielding pattern interconnects the first micro-slit patterns' micro-electrodes' end portions adjacent to the second sub-pixel electrode or the second micro-slit patterns' micro-electrodes' end portions adjacent to the first sub-pixel electrode, to shield the sub-pixel electrodes from each other to prevent distortion of the liquid crystal directors. The shapes of the contact patterns and connections between the contact patterns and the micro-slit patterns' micro-electrodes are adjusted to suppress the distortion of the liquid crystal directors. Thus, textured image defects generated by light leakage and the distortion of the liquid crystal directors may be minimized to improve the display quality of the LCD.

The embodiments described above illustrate but do not limit the present teachings. Other embodiments and variations are within the scope of the present disclosure of invention.

What is claimed is:

1. A display substrate comprising:
a plurality of gate lines extending longitudinally in a first direction;
a plurality of data lines extending longitudinally in a different second direction and intersecting the gate lines; and
a pixel electrode structure electrically coupled by way of at least one switching element to at least one of the gate lines and at least one of the data lines, the pixel electrode structure comprising one or more micro-slit patterns and a first shielding pattern, each of the micro-slit patterns comprising a respective plurality of spaced apart micro-electrodes extending longitudinally in third directions that are different from the first and second directions, the spaces between adjacent ones of the micro-electrodes defining slits, the first shielding pattern interconnecting end portions of two or more of the micro-electrodes of one of the micro-slit patterns, the end portions which are interconnected by the first shielding pattern being in overlapping relation with one of the gate lines,
wherein the one of the micro-slit patterns whose micro-electrode end portions are interconnected by the first shielding pattern is an outwardly radiating star pattern having a center portion and having its spaced apart micro-electrodes radiating outwardly from the center portion in a substantially radiating out star-like pattern that extends to outer boundaries of the one micro-slit pattern and wherein the one micro-slit pattern is coupled to receive a driving current at its said center portion and to distribute the received driving current from the center portion to the outer boundaries of the star pattern by way of its outwardly radiating micro-electrodes.

2. A display substrate comprising:
a plurality of gate lines extending longitudinally in a first direction;
a plurality of data lines extending longitudinally in a different second direction and intersecting the gate lines; and
a pixel electrode structure electrically coupled to at least one of the gate lines and at least one of the data lines, the pixel electrode structure comprising one or more micro-slit patterns and a first shielding pattern, each of the micro-slit patterns comprising a respective plurality of spaced apart micro-electrodes extending longitudinally in third directions that are different from the first and second directions, the spaces between adjacent ones of the micro-electrodes defining slits, the first shielding pattern interconnecting end portions of two or more of the micro-electrodes of one of the micro-slit patterns, the end portions which are interconnected by the first shielding pattern being in overlapping relation with one of the gate lines, and
wherein the pixel electrode structure comprises:
a first sub-pixel electrode that includes a respective first micro-slit pattern from among the one or more micro-slit patterns; and
a second sub-pixel electrode that includes a respective second micro-slit pattern from among the one or more micro-slit patterns, the second sub-pixel electrode being spaced apart from the first sub-pixel electrode and being connected to the same gate line with the first sub-pixel electrode.

3. The display substrate of claim 2, wherein the first sub-pixel electrode comprises a second shielding pattern that is spaced apart from the first shielding pattern and provides an interconnection between others of the first micro-slit pattern's micro-electrodes' end portions which other end portions are disposed adjacent to the second micro-slit pattern.

4. The display substrate of claim 2, wherein the second sub-pixel electrode comprises a second shielding pattern interconnecting respective end portions of the micro-electrodes of the second micro-slit pattern where the end portions interconnected by the second shielding pattern are disposed adjacent to the first micro-slit pattern.

5. The display substrate of claim 2,
wherein the first sub-pixel electrode comprises a second shielding pattern that is spaced apart from the first shielding pattern and provides an interconnecting between others of the first micro-slit pattern's micro-electrodes' end portions which other end portions are disposed adjacent to the second micro-slit pattern, and
the second sub-pixel electrode comprises a third shielding pattern interconnecting respective end portions of the micro-electrodes of the second micro-slit pattern where the end portions interconnected by the third shielding pattern are disposed adjacent to the second shielding pattern.

6. The display substrate of claim 1, wherein, within each respective one of the micro-slit patterns, a plurality of the respective micro-electrodes are parallel to each other and are oblique to the gate lines and the data lines.

7. The display substrate of claim 6, wherein the first shielding pattern is parallel to the gate lines.

8. The display substrate of claim 6,
wherein the pixel electrode structure further comprises a contact pattern provided within one of the micro-slit patterns and having an interlayer contact making contact with an output electrode of the switching element, the contact pattern being connected to adjacent end portions of one or more of the micro-electrodes of the one micro-slit pattern.

9. The display substrate of claim 8, wherein each of the adjacent end portions meets the contact pattern at an angle other than about 90°.

10. The display substrate of claim 9, wherein the output electrode and the contact pattern each have a chamfered corner.

11. The display substrate of claim 2, further comprising a spacer for maintaining a cell gap, the spacer being disposed in a region overlapping with the second sub-pixel electrode and the gate lines.

12. A liquid crystal display panel comprising:
a display substrate comprising a pixel electrode structure, the display substrate further comprising gate lines extending longitudinally in a first direction and data lines extending longitudinally in a different second direction and intersecting the gate lines, the pixel electrode structure being electrically coupled by way of at least one switching element to at least one of the gate lines and at least one of the data lines, the pixel electrode structure comprising a plurality of micro-slit patterns and a first shielding pattern, each of the micro-slit patterns comprising a plurality of micro-electrodes extending longitudinally in third directions that are different from the first and second directions, adjacent ones of the micro-electrodes being separated from one another to thereby define intervening slits, the first shielding pattern interconnecting end portions of a plurality of the micro-electrodes of one of the plurality of the micro-slit patterns, where the end portions that are interconnected by the first shielding pattern are in overlapping relation with one of the gate lines, wherein the one of the micro-slit patterns whose micro-electrode end portions are interconnected by the first shielding pattern is an outwardly radiating star pattern having a center portion and having its spaced apart micro-electrodes radiating outwardly from the center portion in a substantially radiating out star-like pattern that extends to outer boundaries of the one micro-slit pattern and wherein the one micro-slit pattern is coupled to receive a driving current at its said center portion and to distribute the received driving current from the center portion to the outer boundaries of the star pattern by way of its outwardly radiating micro-electrodes;
an opposite substrate disposed opposite to and spaced apart from the display substrate and comprising a common electrode; and
a liquid crystal layer disposed between the display substrate and the opposite substrate.

13. The liquid crystal display panel of claim 12,
wherein the plurality of micro-slit patterns of the pixel electrode structure defines:
a first sub-pixel electrode that includes a respective first micro-slit pattern from among the plurality of micro-slit patterns, the first sub-pixel electrode being electrically coupled for receiving a first data voltage; and
a second sub-pixel electrode that includes a respective second micro-slit pattern from among the plurality of micro-slit patterns, the second sub-pixel electrode being electrically coupled for receiving a second data voltage higher than the first data voltage.

14. The liquid crystal display panel of claim 13, wherein the first sub-pixel electrode comprises a second shielding pattern interconnecting the first micro-slit pattern's micro-electrodes' end portions adjacent to the second micro-slit pattern.

15. The liquid crystal display panel of claim 13, wherein the second sub-pixel electrode comprises a third shielding pattern interconnecting the second micro-slit pattern's micro-electrodes' end portions adjacent to the first micro-slit pattern.

16. The liquid crystal display panel of claim 13, wherein the first sub-pixel electrode comprises a second shielding pattern interconnecting the first micro-slit pattern's micro-electrodes' end portions adjacent to the second micro-slit pattern, and
the second sub-pixel electrode comprises a third shielding pattern interconnecting the second micro-slit pattern's micro-electrodes' end portions adjacent to the second shielding pattern.

17. The liquid crystal display panel of claim 12, further comprising a spacer for maintaining a cell gap of the liquid crystal layer, the spacer being disposed in a region overlapping with the gate lines.

18. The liquid/crystal display panel of claim 17, wherein a width (w) of the first shielding pattern is determined by the following equation:

0<w<d wherein 'd' represents the cell gap.

19. The liquid crystal display panel of claim 12, wherein the display substrate further comprises a color filter layer formed over the gate lines and the data lines and under the pixel electrode.

20. A method for manufacturing a display substrate, the method comprising:
forming a plurality of gate lines extending longitudinally in a first direction;
forming a plurality of data lines extending longitudinally in a different second direction and intersecting the gate lines; and
forming a pixel electrode structure electrically coupled by way of at least one switching element to at least one of the gate lines and at least one of the data lines, the pixel electrode structure comprising one or more micro-slit patterns and a first shielding pattern, each of the micro-slit patterns comprising a plurality of spaced apart micro-electrodes extending longitudinally in third directions that are different from the first and second directions, the spaces between adjacent ones of the micro-electrodes defining slits, the first shielding pattern interconnecting end portions of two or more of the micro-electrodes of one of the micro-slit patterns, the end portions which are interconnected by the first shielding pattern being in overlapping relation with one of the gate lines,
wherein the one of the micro-slit patterns whose micro-electrode end portions are interconnected by the first shielding pattern is an outwardly radiating star pattern having a center portion and having its spaced apart micro-electrodes radiating outwardly from the center portion in a substantially radiating out star-like pattern that extends to outer boundaries of the one micro-slit pattern and wherein the one micro-slit pattern is coupled to receive a driving current at its said center portion and to distribute the received driving current from the center portion to the outer boundaries of the star pattern by way of its outwardly radiating micro-electrodes.

21. The display substrate of claim 2, wherein the first sub-pixel electrode is electrically coupled for receiving a first data voltage, and the second sub-pixel electrode is electrically coupled for receiving a second data voltage higher than the first data voltage.

22. A display substrate comprising:
a plurality of gate lines extending longitudinally in a first direction;
a plurality of data lines extending longitudinally in a different second direction and intersecting the gate lines; and
a pixel electrode structure electrically coupled by way of at least one switching element to at least one of the gate lines and at least one of the data lines, the pixel electrode structure comprising one or more micro-slit patterns and a first shielding pattern, each of the micro-slit patterns comprising a respective plurality of micro-electrodes spaced apart from each other and extending longitudinally in different directions from the first and second directions,
the first shielding pattern interconnecting end portions of two or more of the micro-electrodes of one of the micro-slit patterns, the end portions which are interconnected by the first shielding pattern being in overlapping relation with one of the gate lines,
wherein the first shielding pattern is connected to the end portions of the micro-electrodes extending in a third direction and a fourth direction different from the third direction, and the third and fourth directions are different from the first and second directions.

23. The display substrate of claim 22, wherein the third direction is substantially perpendicular to the fourth direction.

24. The display substrate of claim 22, wherein the third direction is slanted to about 45° with respect to the first direction, and the fourth direction is slanted to about 135° with respect to the first direction.

25. The display substrate of claim 22, wherein each of the micro-slit patterns
comprises a body portion connected to the micro-electrodes thereof, and wherein the body portion comprises a portion extending in the second direction.

26. The display substrate of claim 22, wherein the third direction and the fourth direction are substantially symmetric with respect to the second direction.

* * * * *